United States Patent [19]
Uchida

[11] Patent Number: 5,593,031
[45] Date of Patent: Jan. 14, 1997

[54] DISC ACCOMMODATION DEVICE INCLUDING MOVABLE DISC HOLDER

[75] Inventor: Hiromichi Uchida, Tokyo, Japan

[73] Assignee: Toyo Chemical Co., Ltd., Tokyo, Japan

[21] Appl. No.: 493,308

[22] Filed: Jun. 21, 1995

[51] Int. Cl.$^6$ ............................................. B65D 85/57
[52] U.S. Cl. ..................... 206/308.1; 206/309; 206/312; 206/313
[58] Field of Search ........................ 206/308.1, 308.3, 206/307, 309, 310, 311, 312, 313, 387.1

[56]  References Cited

U.S. PATENT DOCUMENTS

| | | | |
|---|---|---|---|
| 3,995,737 | 12/1976 | Ackeret | 206/387.1 |
| 3,995,921 | 12/1976 | Ackeret | 206/387.1 X |
| 4,493,417 | 1/1985 | Ackeret | 206/311 X |
| 4,635,792 | 1/1987 | Yamada et al. | 206/310 |
| 4,655,344 | 4/1987 | Ackeret | 206/308.1 |
| 4,702,369 | 10/1987 | Philosophe | 206/310 X |
| 4,747,484 | 5/1988 | Ackeret | 206/307 X |
| 4,875,578 | 10/1989 | Nehl | 206/309 |
| 5,000,316 | 3/1991 | Lerner | 206/309 |
| 5,244,084 | 9/1993 | Chan | 206/308.1 |
| 5,265,721 | 11/1993 | Castritis | 206/309 |
| 5,360,107 | 11/1994 | Chasin et al. | 206/313 |
| 5,495,939 | 3/1996 | Castritis | 206/307 |

*Primary Examiner*—Paul T. Sewell
*Assistant Examiner*—Tara Laster
*Attorney, Agent, or Firm*—Wenderoth, Lind & Ponack

[57]  ABSTRACT

An optical disc accommodation device permits an optical disc to be removed therefrom and inserted therein very quickly and readily with a single hand of a driver while driving a vehicle, as well as permitting very quick and ready removal and insertion of an optical disc in home or office installation. The device includes a box-shaped casing and an optical disc holder accommodated thereinto carry an optical disc. The box-shaped casing includes an accommodating part which can movably accommodate the optical disc holder and a lid hinged to one side of the accommodating part for opening and closing the same. One side of the casing has an opening for inserting therethrough the optical disc. A spring is provided between the optical disc holder and the accommodating part to bias the optical disc holder in a direction of projection from the opening. A lock includes a locking member provided on the optical disc holder and a raised portion provided on an inner surface of the accommodating part. The optical disc holder is locked with the raised portion abutted by the locking member when the optical disc holder is urged by the spring toward the opening. An outer surface of the accommodating part is provided with lock release to release the lock of the optical disc holder and to enable the optical disc holder to be moved by the spring to project from the opening.

5 Claims, 6 Drawing Sheets

5,593,031

DISC ACCOMMODATION DEVICE INCLUDING MOVABLE DISC HOLDER

BACKGROUND OF THE INVENTION

1. Field of the Invention

This invention relates to disc accommodation devices for accommodating optical discs, such as musical compact discs (CD), compact discs (CD-ROM) for computers, etc. More particularly, the invention is directed to such a disc accommodation device that permits quick and smooth insertion and removal of a disc such as an optical disc and that can reliably accommodate an optical disc without contaminating or damaging the disc.

2. Prior Art

A prior disc accommodation device includes a holder plate for holding a disc such as an optical disc in the center hole thereof and a lid member hinged to one side of the holder plate. This device is used for almost all commercially available musical compact discs. It is very simple in structure, and its functions are protection and packing of an optical disc. For such prior art disc accommodation device with the purposes of protection and packing of a disc, however, no consideration has been given to handling convenience in the insertion and removal of a disc. More specifically, to insert or remove an optical disc in or from the prior art optical disc accommodation device, cumbersome three stages of operation are necessary, i.e., holding the holder plate with one hand, opening the lid member with the other hand, and inserting or removing the optical disc with such other hand. Also, the lid member can be opened and closed only in one direction relative to the holder plate. Therefore, there is a problem that the lid cannot be readily opened if the top or lid of the device is taken as the bottom or oriented downwardly.

The above inconveniences in the insertion and removal of an optical disc are a serious problem when handling optical discs in a moving vehicle as well as in home or office installations. During driving of a vehicle it is difficult for the driver to load an optical disc into a compact disc player without interfering with driving. Thus, it is very dangerous to attempt to load a disc by releasing the vehicle steering wheel. In home or office installation, storage of a plurality of optical disc accommodation devices such that they are movable relative to one another necessitates the use of a rack or the like. Such a rack limits the number of optical disc accommodation devices that can be stored. Improvement therefore is desired of convenience and handling.

SUMMARY OF THE INVENTION

An object of the invention, accordingly, is to provide a disc accommodation device, which permits quick and ready removal and insertion of a disc such as an optical disc in a home or office installation and which also permits very quick and ready removal and insertion of a disc by one hand of a driver while driving a vehicle.

DETAILED DESCRIPTION OF THE PREFERRED EMBODIMENT

Figure 1:
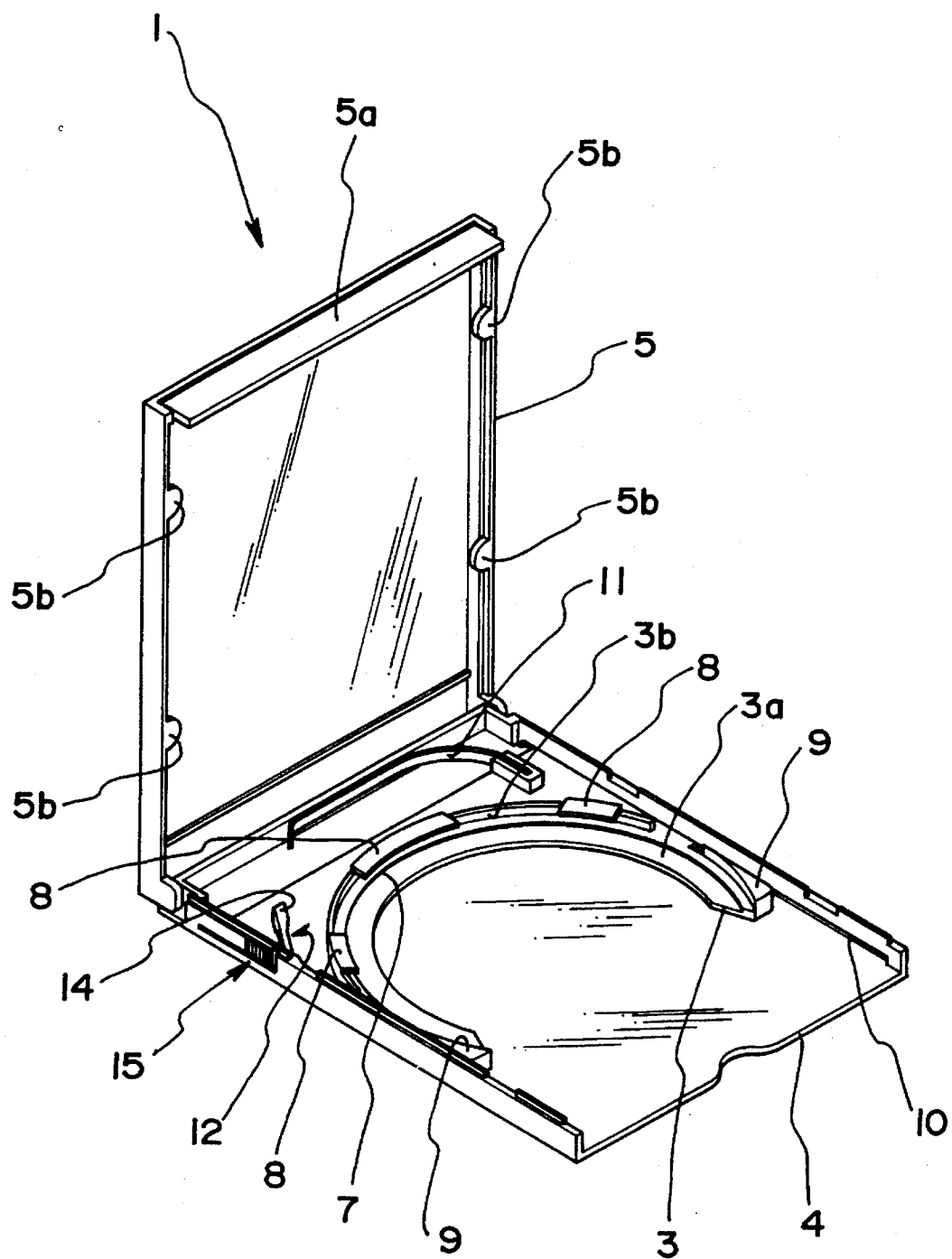
FIG. 1 is a perspective view showing a disc accommodation device according to the invention, with a lid thereof shown opened.

FIGS. 1 to 6 show a disc accommodation device 1 according to the invention, hereinafter referred to for use with an optical disc.

The device i comprises an optical disc holder 3 for holding an optical disc 2 and a box-shaped casing 6, which has a base or accommodating part 4 within which the optical disc holder 3 is movably mounted and a lid 5 hinged to one side of the accommodating part 4 to enable opening and closing movement of lid 5 relative to the accommodating part 4. The box-shaped casing 6 has an opening 6a which is provided on the side opposite the side of hinged coupling between the accommodating part 4 and lid 5, the optical disc 2 being insertable into and removable from the casing 6 through the opening 6a. The lid 5 has a lid portion 5a which can open and close the opening 6a. The box-shaped casing 6 is specifically a transparent synthetic resin molding so that the optical disc 2 accommodating therein can be seen therethrough.

The optical disc holder 3 has a front or upper surface having formed therein an optical disc accommodation recess 3a which has a diameter and a depth sufficient to accommodate therein the optical disc 2. To prevent the recorded portion of the optical disc 2 from being damaged by contact with the bottom surface of the recess 3a, the recess 3a has a circumferential shoulder 7 which is to be in contact with an edge portion, i.e. non-recorded portion, of the optical disc 2 so that the disc 2 is held in a raised manner above the bottom surface. The optical disc accommodation recess 3a is notched or cut away substantially on the side of the opening 6a because the central portion of the recess does not contact the optical disc 2 and has no bearing on the insertion and removal of the disc 2.

Figure 2:
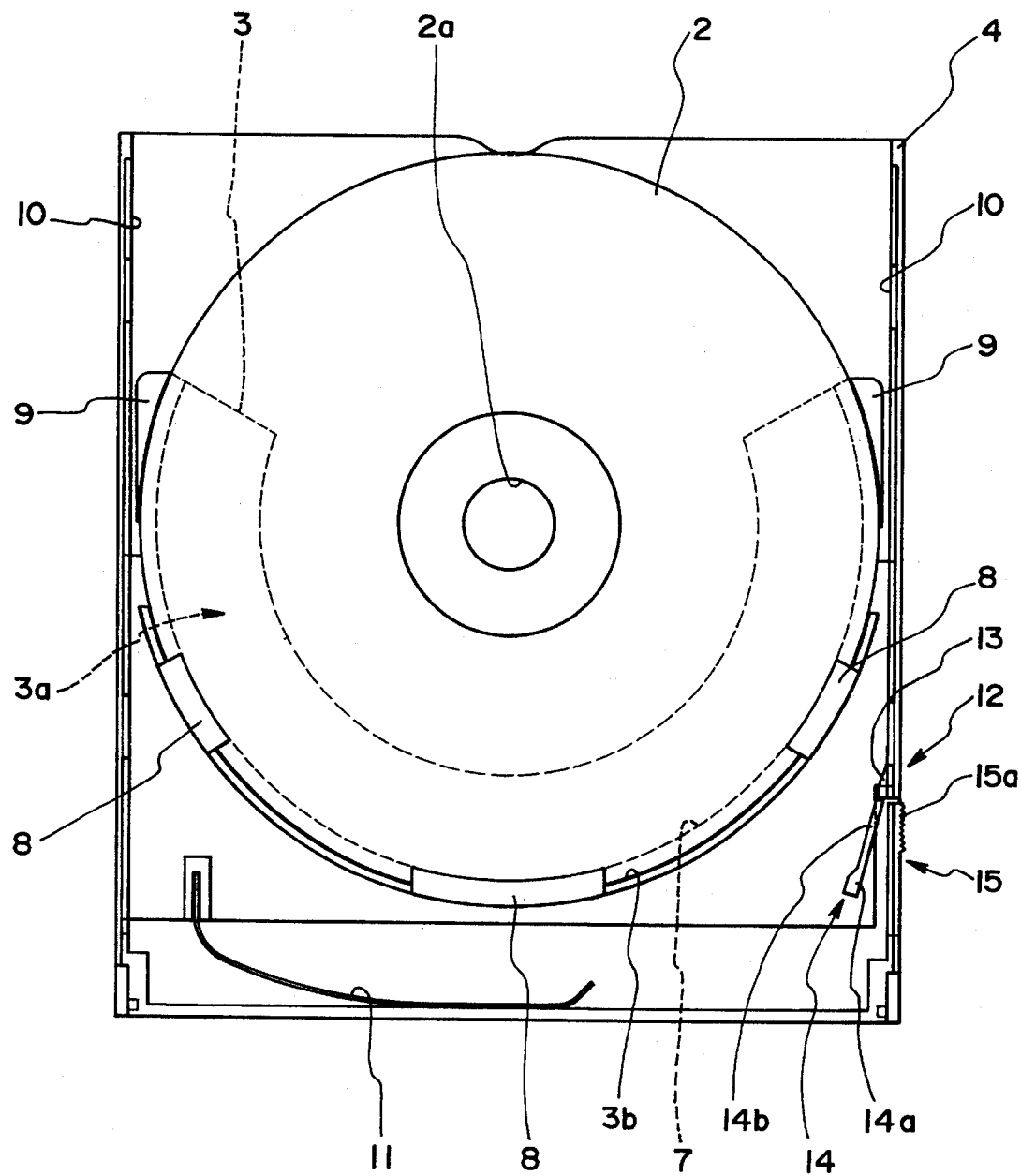
FIG. 2 is a plan view showing the disc accommodation device according to the invention accommodating a disc and with the lid removed.
Figure 3:
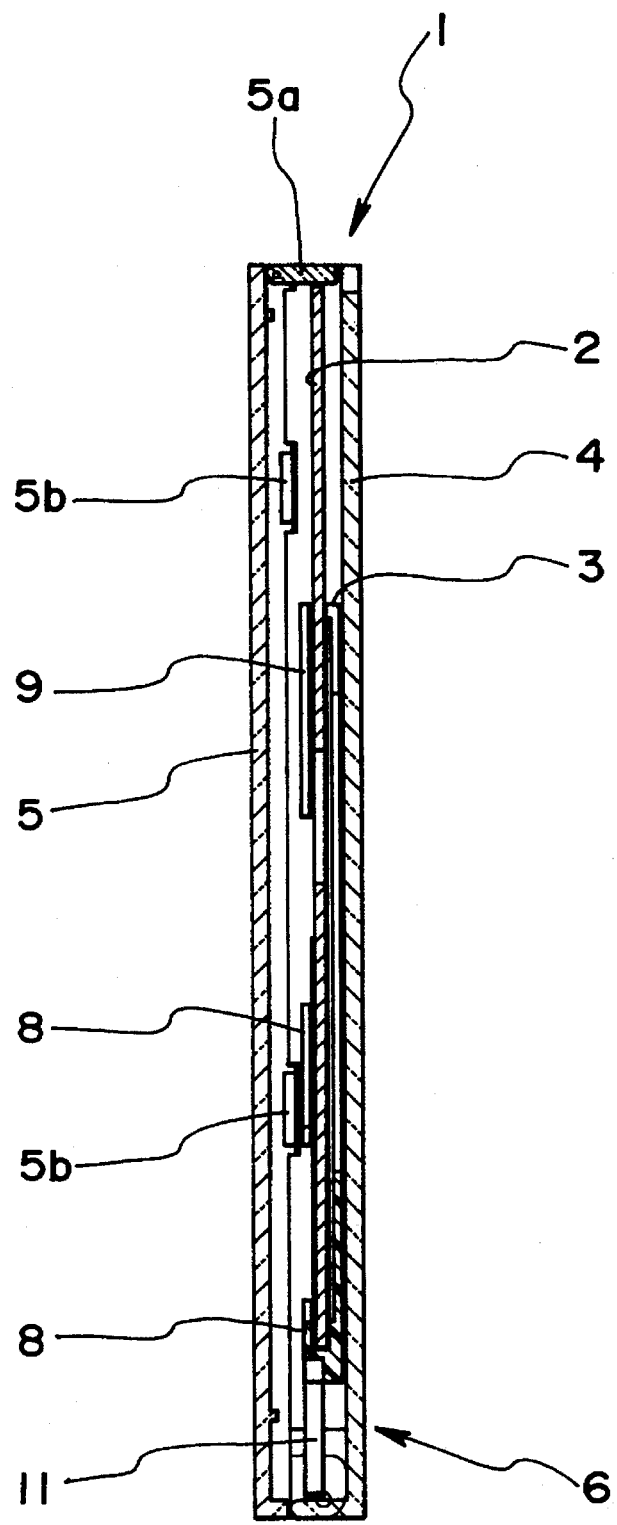
FIG. 3 is a sectional view showing the disc accommodation device according to the invention.
Figure 4:
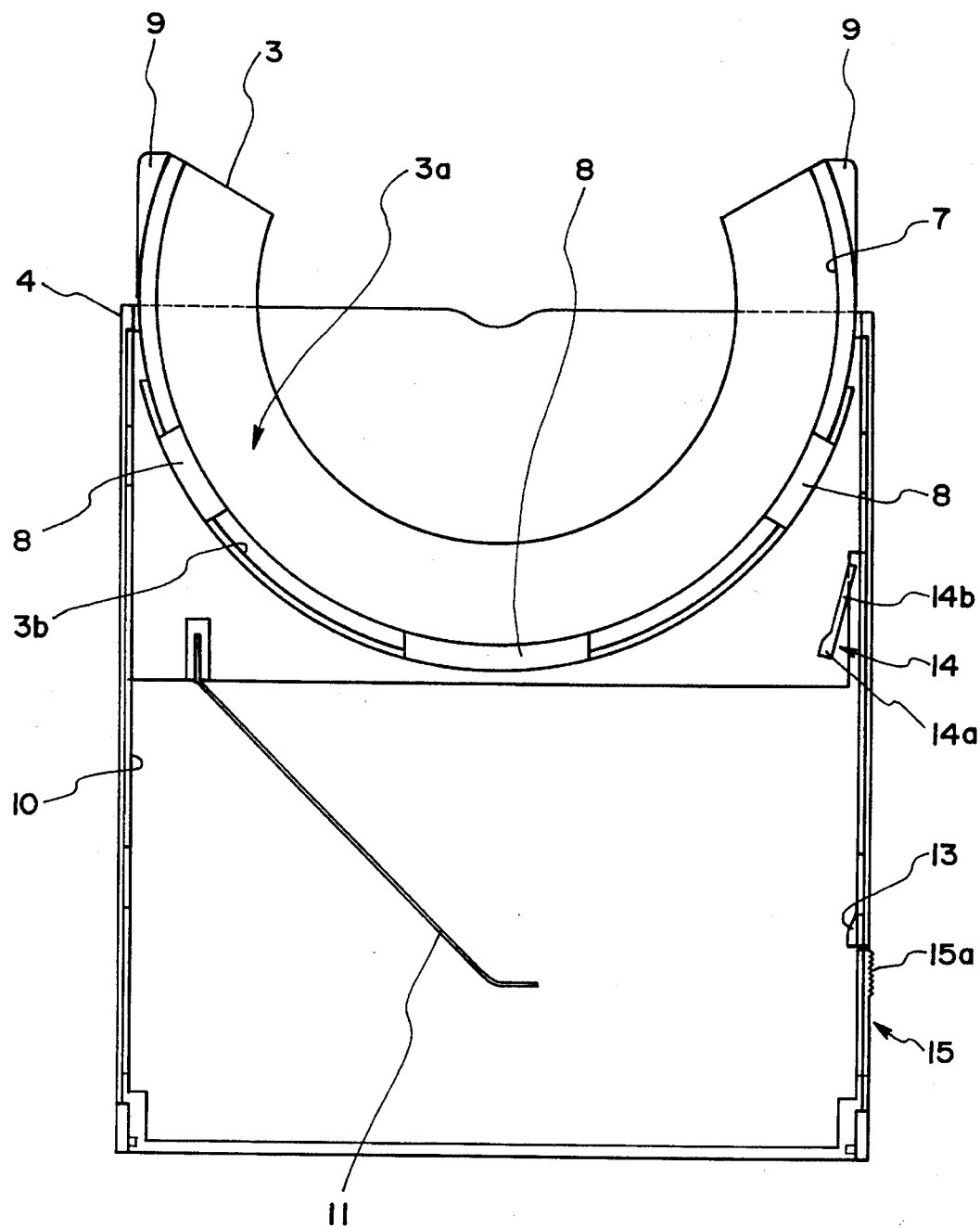
FIG. 4 is a plan view showing the disc accommodation device according to the invention with the lid removed.
Figure 5:
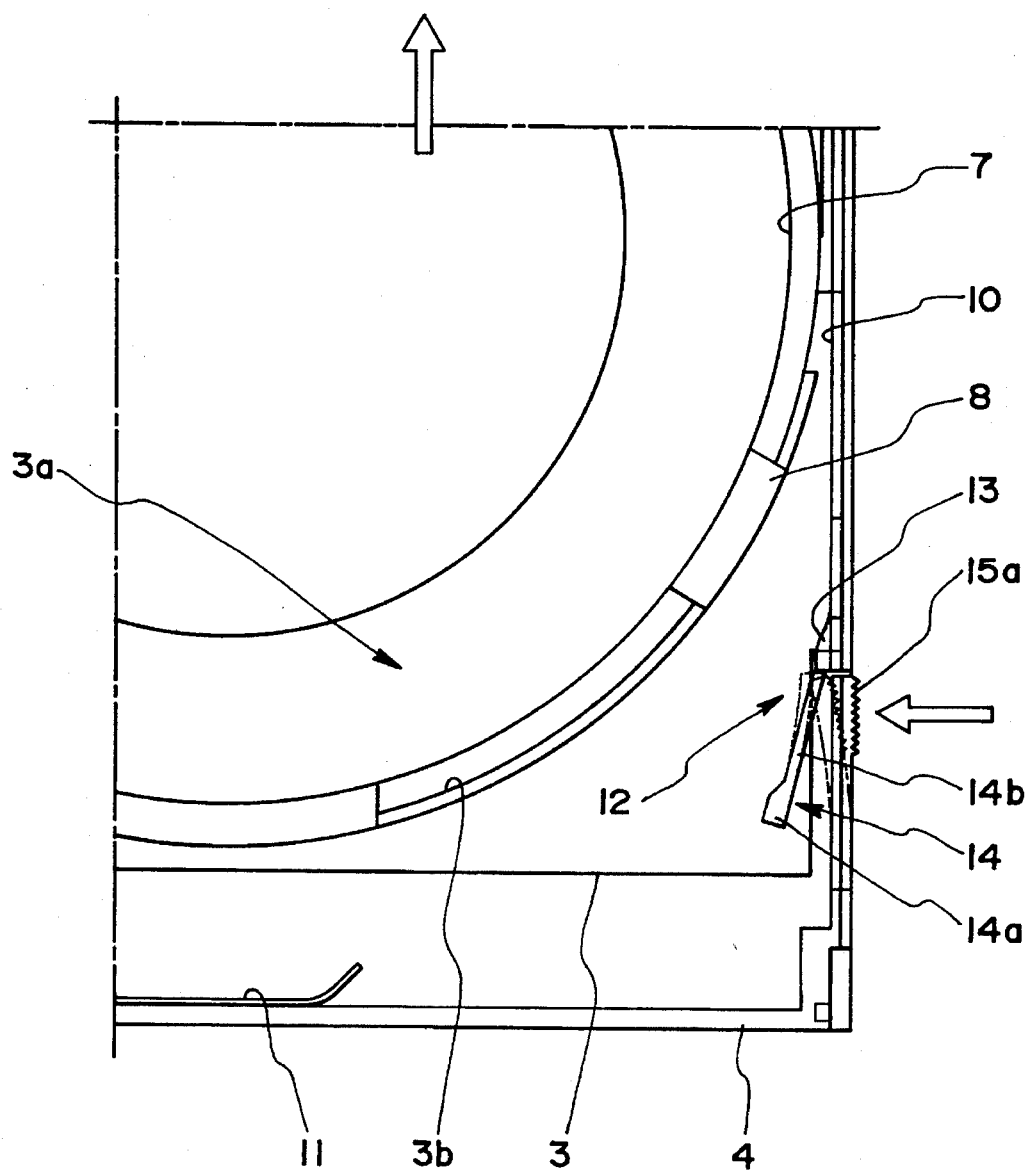
FIG. 5 is a fragmentary enlarged plan view, partly broken away, showing a lock device of the disc accommodation device according to the invention.
Figure 6:
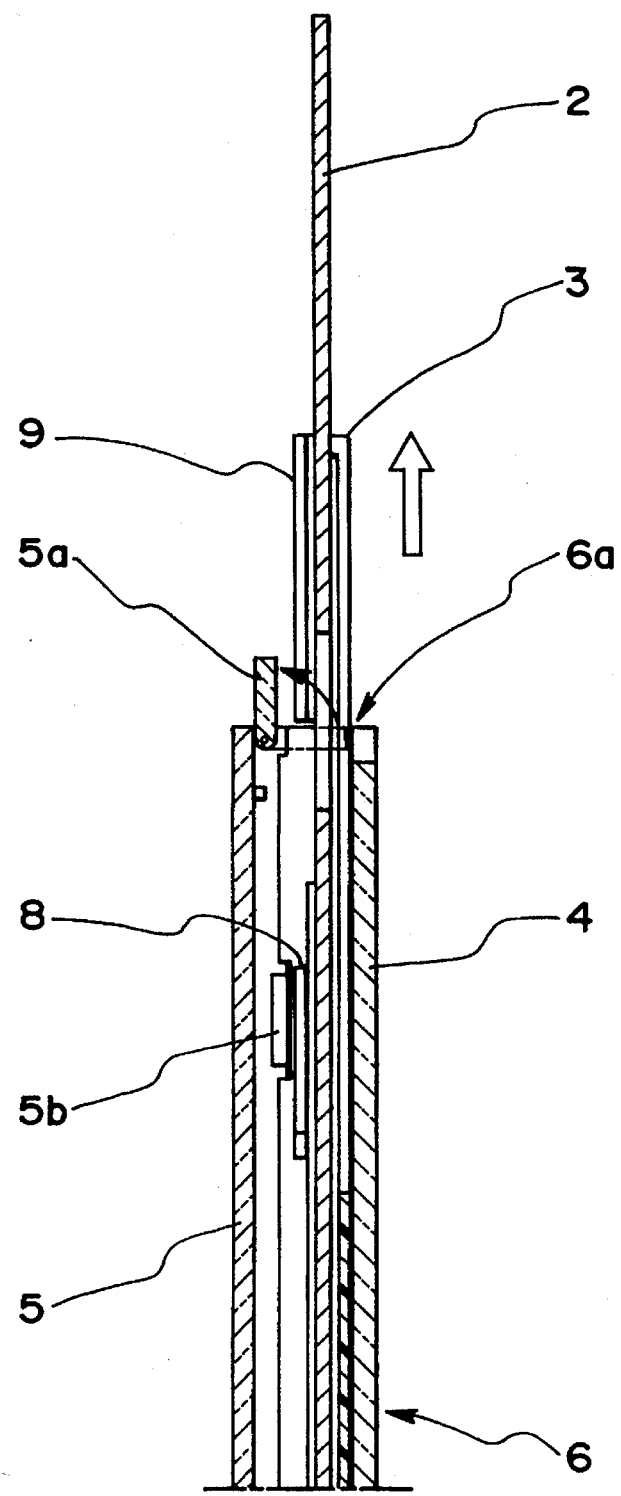
FIG. 6 is a fragmentary enlarged sectional view showing an opening of the disc accommodation device according to the invention.

As shown in FIGS. 2 and 4, an inner peripheral wall 3b of the optical disc accommodation recess 3a, formed in the optical disc holder 3, is to be in contact with about three-fourths of the circumference of the optical disc 2 when the disc 2 is held by the holder 3. A portion of the holder 3 surrounding the optical disc accommodation recess 3a has tongues or retainers 8 provided at three positions on a side opposite the opening 6a and projecting into the recess 3a. The edge of the accommodated optical disc 2 is clamped between the tongues 8 and the shoulder 7. The portion of holder 3 outwardly of the recess 3a further has stoppers 9 provided adjacent the notch of the recess 3a. The stoppers 9 serve to prevent the optical disc 2 from being detached from the inner periphery 3b of the recess 3a toward the opening 6a.

The inner surface of lid 5 is formed with an accommodating portion formed by hooks 5b formed at four corner positions for hooking and retaining a rectangular disc jacket and such paper material as liner notes, specifications, etc. accessory to the accommodated optical disc 2. The lid 5 is opened when inserting and removing such disc jacket or paper material.

The optical disc holder 3 is movable through the accommodating part 4 with opposite side rear or lower portions of holder 3 engaged in grooves 10 formed in opposite inner side surfaces of the accommodating part 4. The optical disc holder 3 is biased by a spring member 11 provided between an end of holder 3 opposite the opening 6a and an inner end surface of the accommodating part 4 opposite the opening 6a. The optical disc holder 3 thus is urged by spring member 11 to project from the opening 6a. At least one of the grooves 10 has an end on the side of the opening 6a that is filled so that it serves as a stop to prevent the optical disc holder 3 from being detached from the accommodating part 4. A step portion formed on a side surface of the optical disc holder 3 is brought into contact with such stop.

The optical disc holder 3 can be locked to the accommodating part 4 by locking means 12. The locking means 12 comprises a raised locking portion 13 projecting inwardly from one side of the accommodating part 4 and a locking member 14 provided on a rear portion of one side of the optical disc holder 3. The locking member 14 has a substantially rectangular stem 14a secured by means of bonding to the optical disc holder 3. The locking member also ha an elongate flexible portion 14b extending from the stem 14a. Portion 14b is not fixed but is biased for slight flexing in the plane of the optical disc holder 3. When the flexing portion 14b is not biased, its free end is at a position of engagement with the locking portion 13.

Reference numeral 15 designated a lock release member for inwardly pushing the end of the flexible portion 14b of the locking member 14. Lock release member 15 has a stem united to a side surface of the accommodating part 4 and also has a finger application end portion 15a. Inward flexing into the accommodating part 4 can be caused by pushing the finger application end portion 15a. When the optical disc holder 3 is locked to the accommodating part 4, pushing of the end portion 15a of the lock release member 15 into the accommodating part 4 causes the portion 14b of member 14 to be flexed inwardly of the locking portion 13. As a result, the optical disc holder 3, which is biased by the spring member 11 at all times, is allowed to be moved to project through the opening 6a. To lock the optical disc holder 3 to the accommodating part 4, the end of the optical disc 2 projecting from the opening 6a is pushed in the direction to move the optical disc holder 3 into the accommodating part 4. As a result, the end of the flexible portion 14b of the locking member 14 moves along the locking portion 13, and during this time it is flexed along the inclined surface of the locking portion 13. When the end of the flexing portion 14b clears the locking portion 13, the biasing by the inclined surface of the locking portion 13 ceases and the flexible portion 14b is restored to its initial position, in this case, locked from outward movement by locking portion 13. Thus, the end of the flexible portion 14b is locked with the locking portion 13 even when the pushing force for pushing the optical disc holder 3 into the accommodating part is released. In this way, the optical disc holder 3 is accommodated in a locked state in the accommodating part 4.

The lid portion 5a has one side rotatably engaged to an edge of the lid 5 to enable the opening 6a of the box-like casing 6 to be opened and closed. When the optical disc holder 3 is caused to project from the box-like casing 6 by the biasing force of the spring member 11, the lid portion 5a, having been positioned to close the opening 6a, readily can be opened by the accommodated optical disc 2.

The optical disc 2 accommodated in the optical disc accommodation recess 3a of the optical disc holder 3 is removed in the following manner. First, the lock release member 15 is pushed to release locking of the optical disc holder 3 from the accommodating part 4 so as to cause projection of an end portion of the optical disc 2 from the opening 6a. The projected end portion of the optical disc 2 is inserted through an insertion opening of a compact disc player mounted in a vehicle, and the end of the optical disc accommodation device 1 is slightly tilted downwardly. As a result, the optical disc 2 is separated from the stoppers 9 to enable disc 2 to be pulled naturally into the player. When removing the optical disc 2 by hand, the end of the edge of the optical disc 2 or the end of the edge and the center hole 2a of the optical disc 2 are grasped, and in this state the edge of the optical disc 2 is caused to ride on the top of the stoppers 9 by lifting or raising the outer end of the optical disc 2. As a result, the optical disc 2 is separated from the stoppers 9. In this state, the optical disc 2 readily can be removed from the optical disc accommodation recess 3a by pulling disc 2 out in a horizontal direction.

To accommodate or insert the optical disc 2 into the optical disc accommodation device 1, by taking hold of the center hole 2a and the edge and the end of the optical disc 2, the end thereof is inserted in a slightly tilted state into the device 1 through the opening 6a such that it slides along the optical disc accommodation recess 3a exposed at the opening 6a. When the disc 2 is inserted up to an intermediate portion thereof, its opposite side edges in the direction of insertion are brought into contact with the tops of the stoppers 9. With the surfaces of the stoppers 9 as a guide, the disc 2 is inserted into the box-shaped casing 6. Eventually, the leading end of the disc 2 is engaged with the tongues 8. In this way, the disc 2 is accommodated and held in the optical disc accommodation recess 3a. The disc 2 is pushed into the box-shaped casing 6, and the locking member 14 is engaged with the locking portion 13, thus inserting and locking the optical disc holder 3 in the box-shaped casing 6. Then, the opening 6a is closed by the lid portion 5a.

Although not specifically shown, the outer surface of the box-shaped casing 6 of the optical disc accommodation device 1 may be provided with an appropriate engagement portion such as raised and depressed portions to be engaged with the engagement portion of the outer surface of the box-shaped casing 6 of an adjacent optical disc accommodation device 1 for stacking together adjacent optical disc accommodation devices 1. With such a structure, no rack is needed to store a plurality of optical disc accommodation devices 1, but the stacked optical disc accommodation devices themselves serve as a rack. Such rack-like stack of optical disc accommodation devices has a convenience that, unlike a rack, there is no limitation on the number of optical disc accommodation devices to be stored, but it is possible to stack any number of optical disc accommodation devices. In accordance with a further convenient aspect, a desired optical disc can be removed by one-touch operation of the lock release member 15 of the optical disc accommodation device accommodating the desired optical disc.

The optical disc accommodation device having the structure as described according to the invention may be used, not only as a package for a compact disc to be sold, but also may be provided as a multiple function case for transferring an optical disc thereto from a conventional optical disc accommodation device.

Thus, the optical disc accommodation device according to the invention comprises a box-shaped casing and an optical disc holder movably accommodated in the box-shaped casing while carrying an optical disc. The box-shaped casing includes an accommodating part for accommodating the optical disc holder and a lid hinged to one side of the accommodating part for opening and closing the accommodating part. The box-shaped casing has an opening for inserting an optical disc therethrough, the box-shaped casing including biasing means for biasing the optical disc holder in a direction of projection from the opening. Locking means locks the optical disc holder in the accommodating part, and lock releasing means enables release of the locking means to thereby allow the optical disc holder to project from the opening. The optical disc holder has an optical disc accommodation recess for receiving the optical disc therein. It is thus possible for a user to remove an optical disc accommodated in the optical disc accommodation device very quickly and readily by holding the device with one hand and operating the lock release means with a finger of that hand. That is, unlike the prior art, it is possible to handle an optical disc with a single hand, not only in a home or office, but also while driving a vehicle. For example, a driver can load an optical disc into a compact disc player while driving a vehicle. Thus, the optical disc accommodation device according to the invention provides not only the conventional functions of protection and packing of an optical disc but also provides great handling convenience in removal and insertion of an optical disc.

Further, with the optical disc holder formed with the optical disc accommodation recess for receiving an optical disc therein and with the inner peripheral wall of the optical disc accommodation recess formed with the stoppers on the opposite sides of an area on the side of the opening so as to be in contact with the edge of the optical disc and prevent detachment thereof toward the opening, the optical disc can be reliably held without possibility of movement in the optical disc accommodation device.

Still further, with the inner periphery of the optical disc accommodation recess provided with tongues on opposite sides of an area on the side opposite the opening, such that the tongues prevent detachment of the optical disc from the optical disc accommodation recess in an upward direction and away from the opening, the optical disc can be reliably held without movement in the accommodating part.

Yet further, with the optical disc accommodation recess provided with a shoulder to be in contact with only the edge of the accommodated optical disc, only the non-recorded portion of the accommodated optical disc is in contact with the holder, and the recorded portion of the disc is held raised above the bottom surface of the optical disc accommodation recess. Thus, there is no possibility of causing damage to the recorded portion of the disc.

Even further, with the provision of the lid with the lid portion for opening and closing the opening of the box-shaped casing, it is possible to prevent intrusion of dust into the optical disc accommodation device without interference with the removal and insertion of the optical disc.

Also, with the engagement portion formed on the outer surface of the box-shaped casing for stacking adjacent box-shaped casings, unlike a rack, it is possible to stack optical discs without limitation imposed on the number of optical discs. In addition, a desired optical disc can be removed by one touch operation of the lock release member of the optical disc accommodation device accommodating the desired optical disc.

What is claimed is:

1. A disc accommodation device capable of storing therein a disc and capable selectively of two-handed manual manipulation to enable manual insertion therein and removal therefrom of the disc and one-handed manual manipulation to insert the disc therein and to remove the disc therefrom directly into a disc player, said device comprising:

a flat box-shaped casing having an interior;

a disc holder located in said interior of said casing, said disc holder having therein a recess and a shoulder outwardly of said recess and configured to enable the disc to be accommodated within said recess and supported therein solely by a peripheral edge portion of the disc resting on said shoulder;

said casing including a base part having first and second opposite ends and a lid having first and second opposite ends, said disc holder being accommodated in said base part with said recess and said shoulder being directed toward said lid;

said first end of said lid being hinged to said first end of said base part such that said lid is pivotable with respect to said base part between a closed position, whereat said second end of said lid is adjacent said second end of said base part, and an open position, whereat said second end of said lid is swung away and spaced from said second end of said base part, said first ends of said base part and said lid defining a closed first end of said casing, and said second ends of said base part and said lid defining therebetween, when said lid is in said closed position, an opening in a second end of said casing;

said disc holder being mounted in said base part for rectilinear movement relative thereto in opposite directions toward and away from said closed first end of said casing between an inserted position, whereat said disc holder is located entirely within said interior of said casing, and a projected position, whereat said disc holder is partially extended through said opening in said second end of said casing;

a spring member operable between said closed first end of said casing and said disc holder to urge said disc holder toward said projected position;

a lock operable to lock said disc holder in said inserted position against the spring force of said spring member, said lock comprising a raised portion extending inwardly from an inner surface of said base part and a lock portion on said disc holder at a position to abut said raised portion upon said spring force urging said disc holder to move from said inserted position;

a lock release operable to release said lock to enable said spring force to move said disc holder from said inserted position to said projected position, said lock release comprising a push member located at a side of said base part and movable inwardly thereof to move said lock portion out of abutment with said raised portion;

stoppers on an end of said disc holder directed toward said opening adjacent opposite sides of said recess and operable to prevent unintended displacement of the disc in said recess in a direction toward said opening; and a retainer on said disc holder at an end of said recess spaced from said opening and operable to prevent unintended displacement of the disc in said recess in a direction toward said lid;

whereby two-handed manual manipulation of said device enables said lid to be pivoted relative to said base part from said closed position to said open position, whereat the disc can be manually inserted into or removed from said recess; and whereby, when said lid is in said closed position, one-handed manual manipulation enables said push member to be moved inwardly to move said lock portion out of abutment with said raised portion such that said spring force of said spring member moves said disc holder to said extended position.

2. A device as claimed in claim 1, wherein said retainer comprises at least one tongue on said disc holder spaced from said shoulder such that the edge of the disc is insertable therebetween.

3. A device as claimed in claim 1, wherein said lock portion is flexible laterally and operable, upon movement of said disc holder from said projected position to said inserted position, to ride over said raised portion, and upon said disc holder reaching said inserted position, deflecting laterally outwardly into abutment with said raised portion.

4. A device as claimed in claim 1, wherein an inner surface of said lid is provided with a portion for accommodating a disc jacket or such paper material as liner notes and specifications accessory to the disc.

5. A device as claimed in claim 1, wherein said second end of said lid has a lid portion located at and closing said opening, said lid portion being opened when said disc holder projects therethrough and closed when said disc holder is in said inserted position.

* * * * *